WADE & KAYE.

Car Wheel.

No. 1,323. Reissued July 8, 1862.

Witnesses:

Wm. Metcalf
W. Wade

Inventor:

Nicholas H. Wade
Joseph Kaye

AM. PHOTO-LITHO. CO. N.Y. (OSBORNE'S PROCESS.)

UNITED STATES PATENT OFFICE.

NICHOLAS K. WADE AND JOS. KAYE, OF PITTSBURG, PENNSYLVANIA.

IMPROVEMENT IN CAR-WHEELS.

Specification forming part of Letters Patent No. 29,927, dated September 4, 1860; Reissue No. 1,323, dated July 8, 1862.

*To all whom it may concern:*

Be it known that we, NICHOLAS K. WADE and JOSEPH KAYE, of Pittsburg, in the county of Allegheny and State of Pennsylvania, have invented a new and useful Improvement in Car-Wheels; and we do hereby declare that the following is a full, clear, and exact description thereof, reference being had to the annexed drawings, forming part of this specification, in which—

Figure 2:
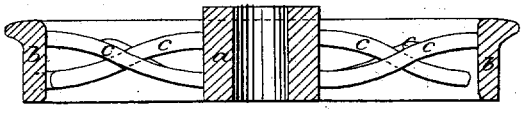
Figure 4:
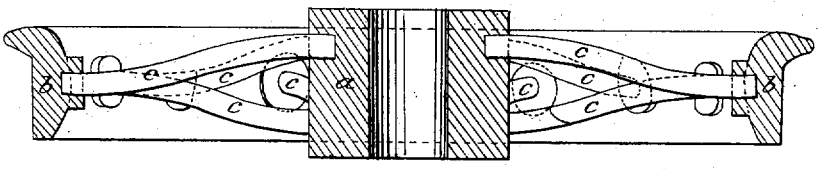
Figure 1:
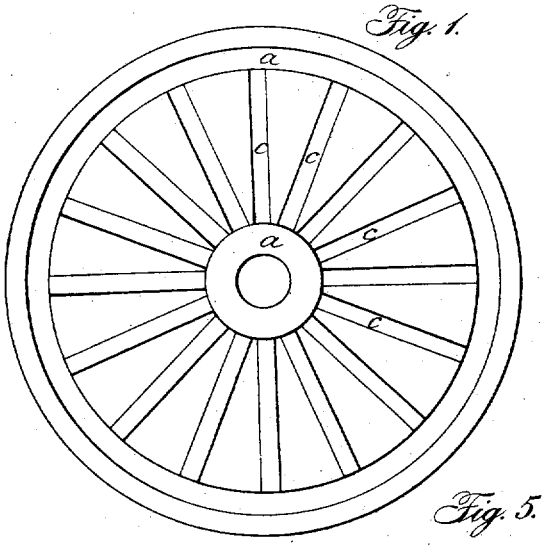
Figure 3:
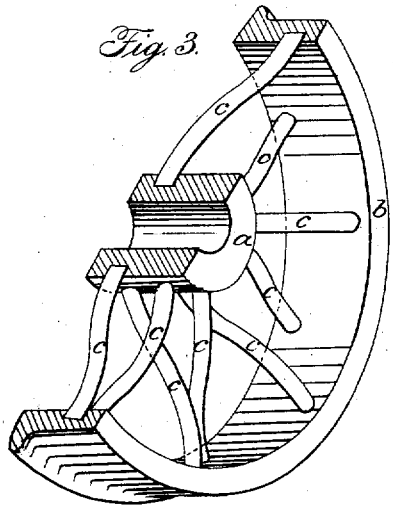
Figure 5:
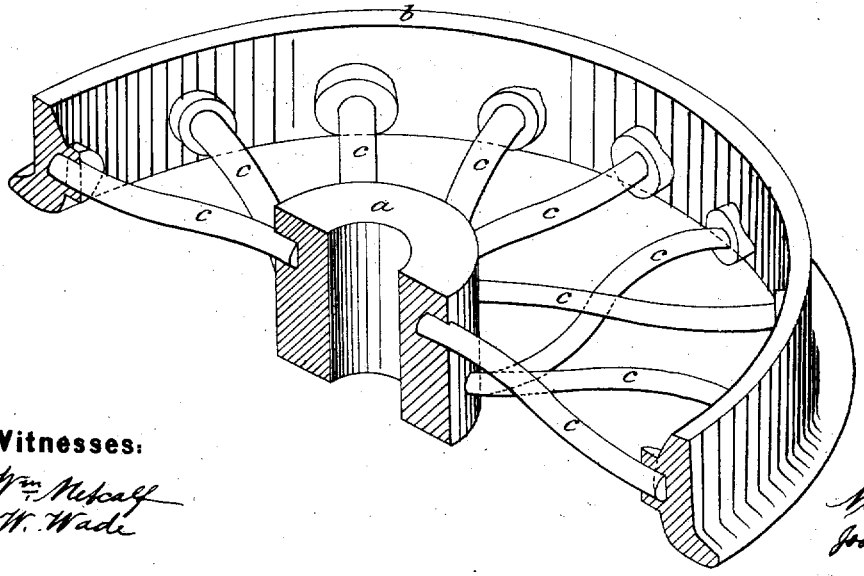

Figure 1 is a plan of our improved car-wheel. Fig. 2 is a transverse section of Fig. 1 through the axis of the wheel. Fig. 3 is a transverse section in perspective of the wheel shown in Figs. 1 and 2. Fig. 4 is a transverse section through the axis of the wheel shown in Fig. 5. Fig. 5 is a transverse section in perspective of a wheel in which the spokes are differently arranged from those in Figs. 2 and 3.

Our invention is designed to remedy the great defect of car-wheels having cast-iron hubs and rims, namely, their liability to crack and fall to pieces when in use; and it consists in the use in such wheels of curved wrought-iron spokes or arms, so arranged or set relatively to the hub and rim as to brace the rim in a plane parallel to the axis of the wheel.

In order to enable others skilled in the art to make and use our invention, we will proceed to describe it more particularly.

It is well known that a great difficulty exists in constructing cast-iron car-wheels, owing to the unequal contraction of the iron in the hub and rim. Oftentimes they crack in cooling, and even if they pass this ordeal safely the great strain on the rim, caused by the contraction of one part of the wheel more rapidly and sooner than the other parts, renders them very liable to break when in use, which is a fruitful cause of disaster. To remedy this, wheels have been cast with straight wrought-iron spokes; but these are little better, because, in cooling, the rim is still subjected to a great strain, and the spokes loosen in both hub and rim. By our invention, however, these difficulties are entirely removed, as the wrought-iron spokes or arms, being curved or bent with single, double, or other curvature, yield by flexion to the pressure of the rim during the contraction of the metal without becoming loose in their bearings; and by being arranged with their extremities alternately near to the outer and inner face of the hub (or rim and hub) so brace the wheel in the plane parallel to its axis as greatly to add to its strength.

In the drawings, *a* is the hub of the wheel. *b* is the rim, and *c c*, &c., are the arms or spokes. The spokes are made of bars of wrought-iron, curved or bent more or less, as may be desired, and with single or compound curvature. A double curvature, as shown in the drawings, is preferred by us. These spokes or arms are so placed in the flask or mold in which the wheel is to be cast as that their extremities project into the cavity made to form the hub and rim, respectively, so that the ends of the spokes may be embedded in the casting. They are also set so that one extremity of each alternate spoke enters the hub in a different plane from that in which it enters the rim, and also in a different plane from that at which the adjoining spoke on either side of it enters the hub, as seen in Fig. 2. Thus one spoke enters the hub near the inner face of the wheel, and enters the rim near the outer face, while the adjoining spoke enters the hub near the outer face of the wheel, and enters the rim near the inner face, and thus the wheel is braced in a plane parallel to its axis, giving greater strength to the wheel than is secured when the spokes enter the hub and rim in the same plane.

Another mode of setting the spokes relatively to the hub and rim is shown in Figs. 4 and 5, where the spokes all enter the rim in the same plane, but enter the hub alternately in different planes, by which means a similar bracing of the wheel is secured.

When the spokes or arms are thus arranged in the flask or mold, the hub and rim are both cast onto them at the same time, and, as the casting cools, the contraction of the rim causes the flexion of the spokes and relieves the casting from the violent strain to which it would otherwise be inevitably subjected.

The bracing of the wheels by the arrangement of the spokes shown in Figs. 2 and 4 prevents any tendency of the hub and rim to change their relative position, and thus secures the wheel from the loosening of the spokes or a tendency to break the rim from that cause.

So great is the superiority of the car-wheel thus constructed over the ordinary cast-iron wheel, even when made with straight wrought-iron spokes, that while the latter is very liable to break in the rim, and when thus broken will fall in pieces by the spokes separating from the hub and rim, the former (our wheel) has no tendency to break arising from any strain on its parts, and, even if broken between the spokes in two or three places, will hold together and run in this condition for a long time, because the spokes are so strongly embedded in and fastened to the rim and hub, and the hub and rim are so securely braced that they have no tendency to come apart. If, therefore, one of our car-wheels should become cracked in the rim, it will still run on, and with very little liability of breaking down.

Having thus described our invention, we do not claim as new the use of wrought-iron spokes or arms in car-wheels; nor do we claim the bracing of car-wheels by diverging or parallel straight arms of wrought-iron; but

What we do claim as our invention, and desire to secure by Letters Patent, is—

The use in car-wheels having cast-iron rim and hub of curved or bent spokes or arms of wrought-iron or other flexible material, so arranged or set relatively to the hub and rim as to brace the rim in a plane parallel to its axis, substantially as described.

In testimony whereof the said NICHOLAS K. WADE and JOSEHH KAYE have hereunto set their hands.

NICHOLAS K. WADE.
JOSEPH KAYE.

In presence of—
M. G. CUSHING,
WM. WADE, Jr.